J. A. H. Te Gantvoort,
Bread Machine.
No. 104,662.        Patented June 21, 1870.
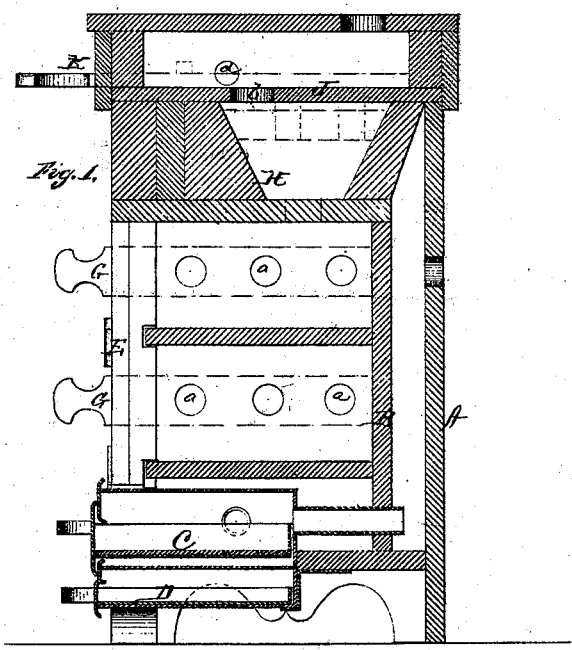
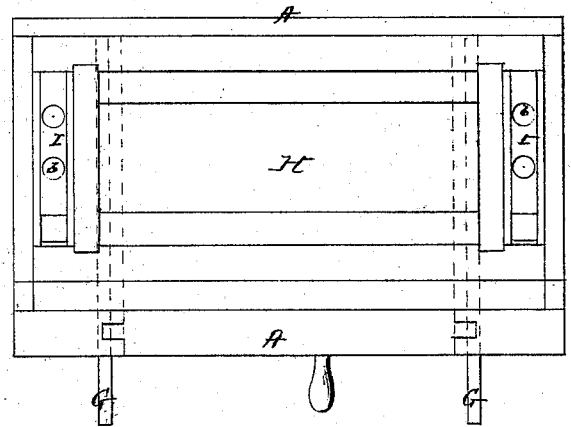

UNITED STATES PATENT OFFICE.

JACOBUS A. H. TE GANTVOORT, OF WAUPUN, WISCONSIN.

IMPROVED BREAD-MAKING APPARATUS.

Specification forming part of Letters Patent No. 104,662, dated June 21, 1870.

*To all whom it may concern:*

Be it known that I, JACOBUS ARNOLDUS HENDREEKUS TE GANTVOORT, of Waupun, in the county of Fond du Lac and State of Wisconsin, have invented certain new and useful Improvements in Bread-Making Apparatus; and I do hereby declare that the following is a full, clear, and exact description thereof, reference being had to the accompanying drawings, and to the letters of reference marked thereon, which form a part of this specification.

The nature of my invention consists in the construction and arrangement of a bread-making apparatus, the peculiarities of which will be hereinafter fully set forth.

In order to enable others skilled in the art to which my invention appertains to make and use the same, I will now proceed to describe its construction and operation, referring to the annexed drawings, in which—

Figure 1 is a transverse vertical section, and Fig. 2 is a plan view with the top removed.

A represents a case, built of any suitable material, inside of which is placed the baking-oven B, leaving a space or chamber between their sides and rear and bottom.

Under the bottom of the baking-oven B is the fire-place C and ash-pan D. Above the fire-place, in the front side of the outer oven, A, are doors E E, leading into the inner or baking oven, B, and on each side of said doors are slides G G, which operate so as to enlarge or diminish certain openings, *a a*, in the sides of the inner oven, B, so as to regulate the heat therein.

On the top of the inner oven, B, is placed a trough, H, the space between the edges of said trough and the upper edges of the outer oven, A, being covered, and the coverings provided with openings *b b*, over which move slides I I, to allow the heat to pass up into the top J, or not, as may be desired. The top J is hollow, and has on its under side perforations corresponding with the openings *b b*. It has also other openings, *d d*, regulated by slides K K, to allow more or less of the heat to pass down into the trough H. The dough is made up in the trough H, and, when made up, the bread is placed in the inner oven, B, for rising, which it will do in a uniform manner, making the bread larger and more nutritious.

Having thus fully described my invention, what I claim as new, and desire to secure by Letters Patent, is—

1. The case A, provided with oven B, slides G I, openings *b b*, hollow cover J, with perforations in its bottom, all arranged substantially in the manner and for the purpose set forth.

2. A bread-making apparatus consisting of case A, oven B, fire place C, doors E E, slides G G, I I, K K, and trough H, arranged as described, and for the purpose set forth.

In testimony that I claim the foregoing as my own I affix my signature in presence of two witnesses.

JACOBUS ARNOLDUS HENDREEKUS TE GANTVOORT.

Witnesses:
 E. M. BEACH,
 HENRY BOLACE.